United States Patent
Naganawa (10) Patent No.: US 8,175,858 B2
(45) Date of Patent: May 8, 2012

(54) MACHINING SIMULATION APPARATUS

(75) Inventor: Yuji Naganawa, Aichi Prefecture (JP)

(73) Assignee: Okuma Corporation, Oguchi-cho (JP)

( * ) Notice: Subject to any disclaimer, the term of this patent is extended or adjusted under 35 U.S.C. 154(b) by 453 days.

(21) Appl. No.: 12/410,314

(22) Filed: Mar. 24, 2009

(65) Prior Publication Data

US 2009/0240482 A1   Sep. 24, 2009

(30) Foreign Application Priority Data

Mar. 24, 2008   (JP) .................................. 2008-76574

(51) Int. Cl.
*G06G 7/48* (2006.01)
(52) U.S. Cl. .............................................. 703/7; 703/1
(58) Field of Classification Search .................. 703/1, 6, 703/7; 700/97, 178
See application file for complete search history.

(56) References Cited

U.S. PATENT DOCUMENTS

| | | | | |
|---|---|---|---|---|
| 5,122,966 A | * | 6/1992 | Jansen et al. | 700/178 |
| 5,416,715 A | * | 5/1995 | Kinoshita et al. | 700/178 |
| 5,751,584 A | * | 5/1998 | Yuasa et al. | 700/178 |

FOREIGN PATENT DOCUMENTS

| | | | |
|---|---|---|---|
| JP | 2628914 | | 4/1997 |
| JP | 2000-284819 | | 10/2000 |
| JP | 2007018145 A | * | 1/2007 |

* cited by examiner

*Primary Examiner* — Paul Rodriguez
*Assistant Examiner* — Luke Osborne
(74) *Attorney, Agent, or Firm* — Nelson Mullins Riley & Scarborough LLP; Anthony A. Laurentano (57) ABSTRACT

A machining simulation apparatus (1) includes a model storage (4) for storing information about machining models (11) that define mechanical elements, such as spindle heads and tables, jig models (12) that define jigs, such as chucks and holders, material models (13) that defines the shapes of workpieces, and tool models (14) that defines the shapes of tools for machining the workpieces. Each tool model comprises a machining tool model (14A) and an interference check tool model (14B). A material model is machined with the machining tool model (14A) according to an axis movement command for cutting feed so as to update the shape of the material model. Subsequently, interference of the interference check tool model with the material model, jig models, and machine models are checked for according to an axis movement command for rapid traverse.

4 Claims, 6 Drawing Sheets

Prior Art

MACHINING SIMULATION APPARATUS

FIELD OF THE INVENTION

The present invention relates to a machining simulation apparatus that simulates cutting of a material model with a tool model and checks for interference between the tool model and the material model by controlling the relative positions of the tool model and the material model according to axis movement commands of a NC program and/or a manual operation.

BACKGROUND OF THE INVENTION

A typical conventional machining simulation apparatus employs a single tool model to cut away part of a material model and check for interference of the tool model with the material model. In other words, this type of apparatus controls the relative positions of the tool model and the material model according to an axis movement command, whereby if the axis movement command is a cutting feed command, the region where the tool model and the material model overlap with each other is removed from the material model as a cutting region and if the axis movement command is a rapid traverse command, the region where the tool model and the material model overlap with each other is identified as an interfering region.

Figure 5:
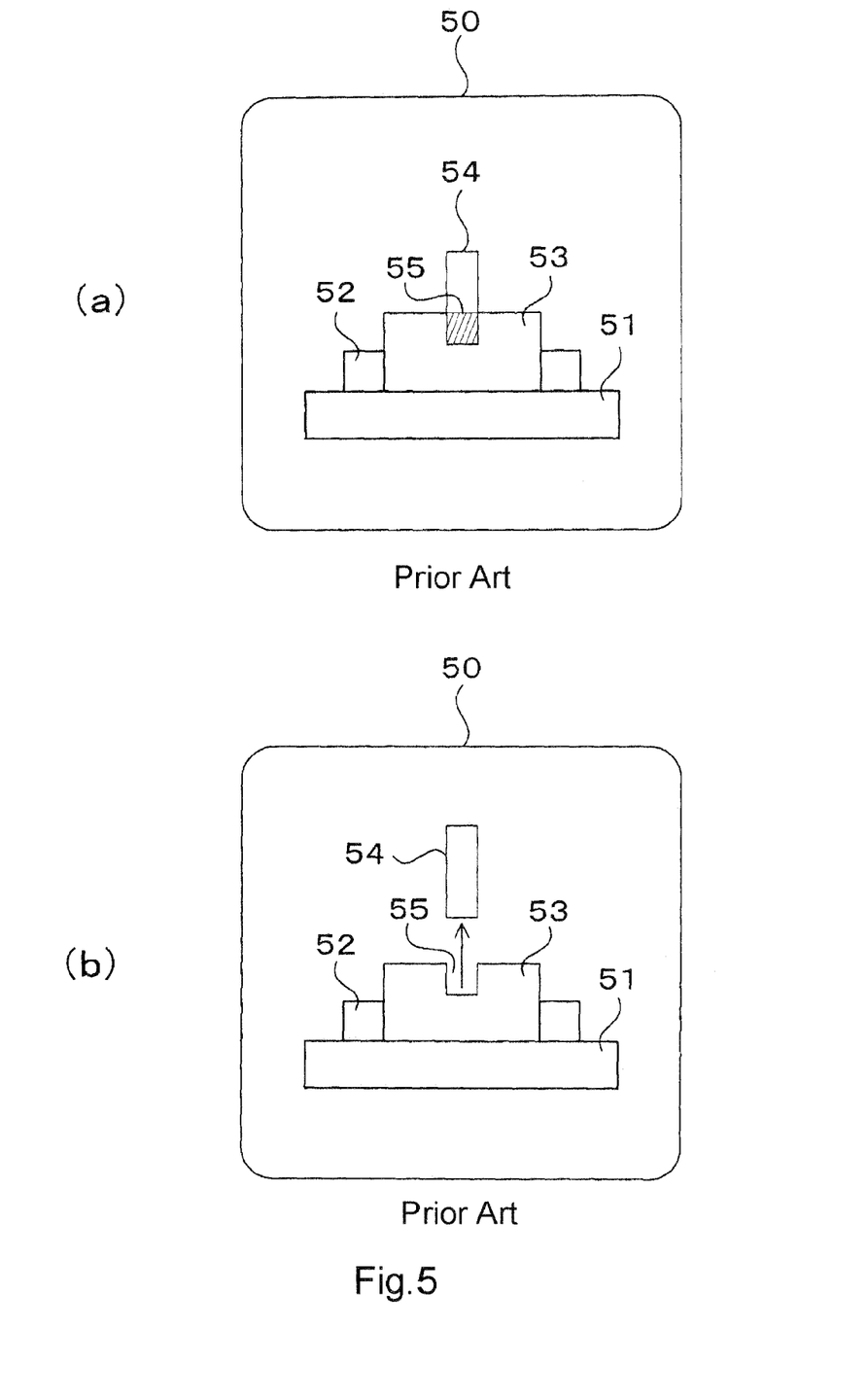
FIG. 5 is a schematic diagram showing a conventional machining simulation apparatus.

In particular, as shown in FIG. 5A, as a first step of its operation, such a conventional simulation apparatus causes a display unit 50 to show on its screen a machine model 51 representing a table on which a workpiece is mounted, a jig model 52 representing a jig that grips the workpiece, a material model 53 representing the workpiece to be machined, and a tool model 54 representing a tool used for machining. Secondly, in accordance with axis movement commands for cutting feed, the tool model 54 is moved relative to the machine model 51, the jig model 52, and the material model 53 so as to calculate the region where the tool model 54 and the material model 53 overlap with each other as a cutting region 55, remove the cutting region 55 from the material model 53, and then update the shape of the material model 53.

In this process, if a tool 540 having a diameter of d is used in the actual machining as shown in FIG. 6A, defining the tool model 54 as a cylinder whose cross section is circular having the same diameter as the tool 540 in this process will result in a cutting region 55 calculated as a cylinder having the same cross sectional area as that of the tool model 54. Alternatively, as shown in FIG. 6B, if the tool model 54 is defined approximately as a polygonal column whose cross section is a polygon inscribed in a cylinder of the same diameter as that of the tool 540, the cutting region 55 will be calculated as a polygonal column having the same cross sectional area as that of the tool model 54.

Figure 6:
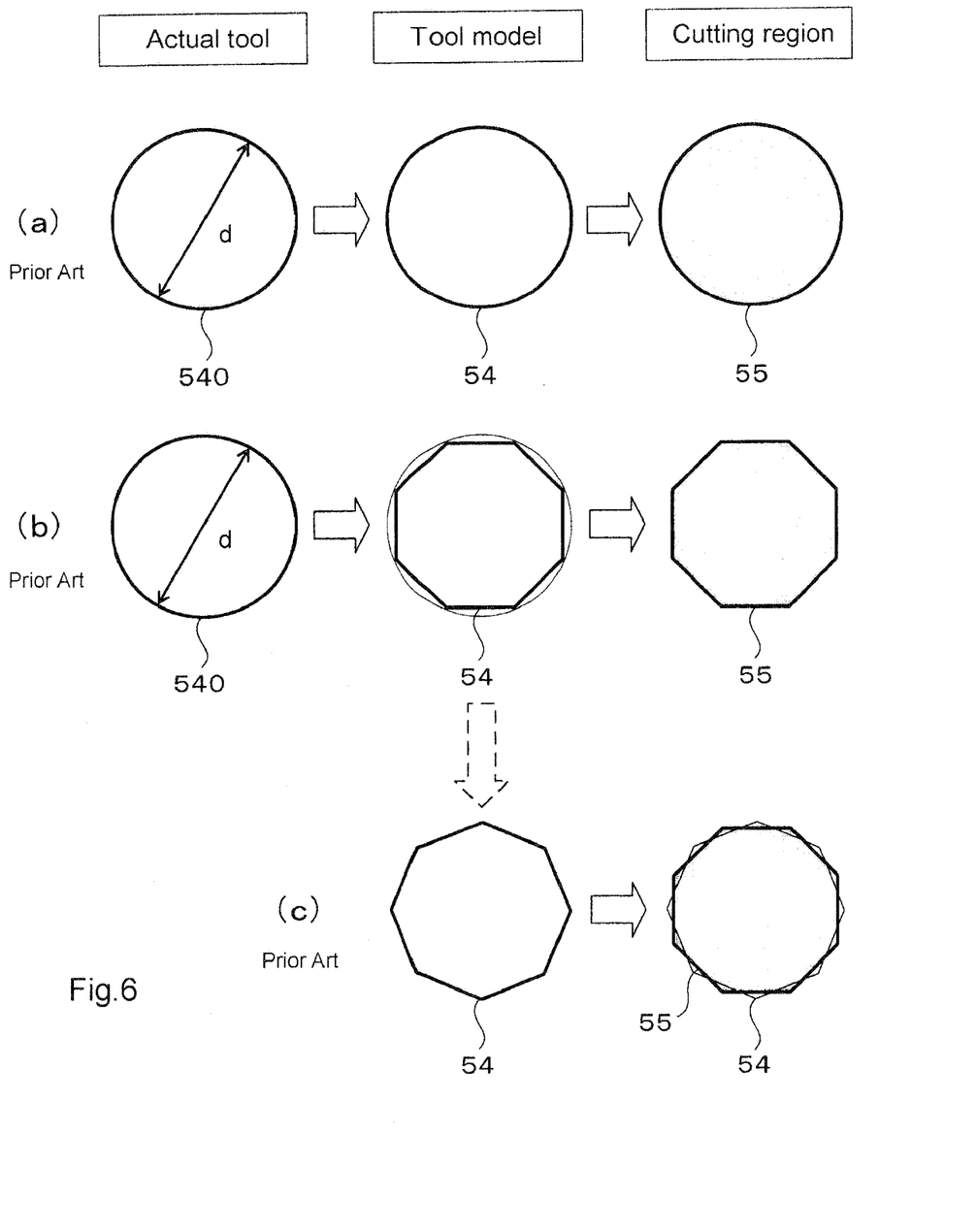
FIG. 6 is a schematic diagram showing the configuration of the tool models of the conventional machining simulation apparatus in FIG. 5.

Subsequently, as shown in FIG. 5B, if the tool model 54 is retracted from the material model 53 according to an axis movement command for rapid traverse, the machining simulation apparatus checks for any interference of the tool model 54 with the material model 53, the jig model 52, and the machine model 51. In this processing, the model defined as having the shape of a cylinder or a polygonal column shown in FIG. 6 is used as the tool model 54 to check if there is any interference between the tool model and the updated version of the material model 53 from which the cutting region 55 of the shape of the cylinder or polygonal column has been removed.

According to this type of interference check, however, due to a computational error in removing the cutting region 55 from the material model 53, the machined portion in the updated material model 53 from which the cutting region 55 has been removed (i.e., the recess shown in FIG. 5B) may not completely match the tool model 54. In this case, the interference check may detect a minute interference between the tool model 54 and the material model 53, causing an alarm to be issued. Accordingly, one conventional approach is to define the region where the machined portion of the updated material model 53 and the tool model 54 overlap with one another as an interference region, calculate the volume of the interference region, and determine that no interference exists if the calculated value does not exceed a predetermined allowable value.

Japanese Patent No. 2,628,914 and Japanese Published Unexamined Patent Application No. 2000-284819 disclose machining simulation apparatuses with interference check capabilities.

SUMMARY OF THE INVENTION

Problems to be Solved by the Invention

According to the conventional machining simulation apparatus, since the volume of an interference region is calculated to determine whether or not the tool model 54 interferes with the material model 53, the volume of the interference region is subject to variation depending on the size of the tool actually used, the machining depth, and other factors, which gives rise to the possibility that contact between the tool model 54 and the material model 53 that should be identified as an interference may go undetected.

Additionally, if a tool is reintroduced in a different phase from the previous time into a location that has been already machined, in the machining simulation of FIG. 6B (where the tool model 54 is defined as having a polygonal cross section), the phase shift or change causes the vertices of the tool model 54 to shift. This may in turn cause the volume of the interference region (the volume of the region where the tool model 54 after the phase shift interferes with the material model 53 minus the region cut away by the tool model before the phase shift) to exceed the allowable value even in the absence of any change in the volume of the cutting region 55, erroneously identifying acceptable contact as interference. Moreover, in order to eliminate this type of erroneous detection or identification, a wide range of allowable values need be set to cope with a variety of conditions, thus rendering the system more complicated.

In view of the above, an important object of the present invention is to solve the above-identified problem and provide a machining simulation apparatus that eliminates the need for calculating the volume of an interference region for subsequent determination and is capable of accurately checking for interference between a tool model and a material model.

Means to Solve the Problems

In order to solve the foregoing problems, the present invention provides a machining simulation apparatus for cutting of a material model with a tool model and checking for interference of the tool model at least with the material model by controlling the relative positions of the tool model and the material model according to axis movement commands.

In particular, the machining simulation apparatus comprises model storage for storing the material model and the tool model and a simulation control unit for updating a shape of the material model on the basis of a locus of the tool model as the tool model is moved according to the axis movement commands. In this apparatus, the tool model stored in the model storage includes a machining tool model for cutting and updating the shape of the material model on the basis of the locus and at least one interference check tool model used for the interference check.

In one aspect, the at least one interference check tool model is defined as having a smaller shape than that of the machining tool model. For example, the machining tool model may be defined as having a circular cross section, with the at least one interference check tool model defined as having a circular cross section whose diameter is smaller than that of the circular cross section of the machining tool model. In another aspect, in order to simplify the calculation, the machining tool model may be defined approximately as having a polygonal cross section and the at least one interference check tool model may be defined as having a circular cross section that is inscribed in the polygon of the machining tool model.

In yet another aspect, the machining tool model includes a cutting tool model and a shank model, and the cutting tool model is used as the machining tool model for updating the shape of the material model according to an axis movement command for cutting feed, whereas the shank model is used as the interference check tool model for checking for any interference between the shank model and the material model according to an axis movement command for rapid traverse.

In one embodiment, a plurality of differently sized interference check tool models are used in combination with the machining tool model for the interference check.

Furthermore, the model storage may further store at least one machine model and at least one jig model, and the inventive apparatus may check for any interference between the tool model and the material model, the at least one machine model, and the at least one jig model.

Effect of the Invention

According to the machining simulation apparatus of the present invention, since the machining tool model and the at least one interference check tool model are used for different purposes, there is no need to determine the volume of interference regions. This eliminates or reduces the possibility that interference that should be identified may go undetected or that acceptable contact is erroneously identified as interference. In this manner, the present invention offers the advantageous effect of accurately checking for interference by using two different types of tool models.

Furthermore, by defining the at least one interference check tool model as having a smaller shape than the machining tool model, the at least one interference check tool model is configured to absorb or tolerate calculation errors that may occur when the material model is updated, thus reducing the processing load on the system.

BRIEF DESCRIPTION OF THE ATTACHED DRAWINGS

For a fuller understanding of the nature and objects of the present invention, reference should be made to the following detailed description and the accompanying drawings, in which.

PREFERRED EMBODIMENTS OF THE INVENTION

Figure 1:
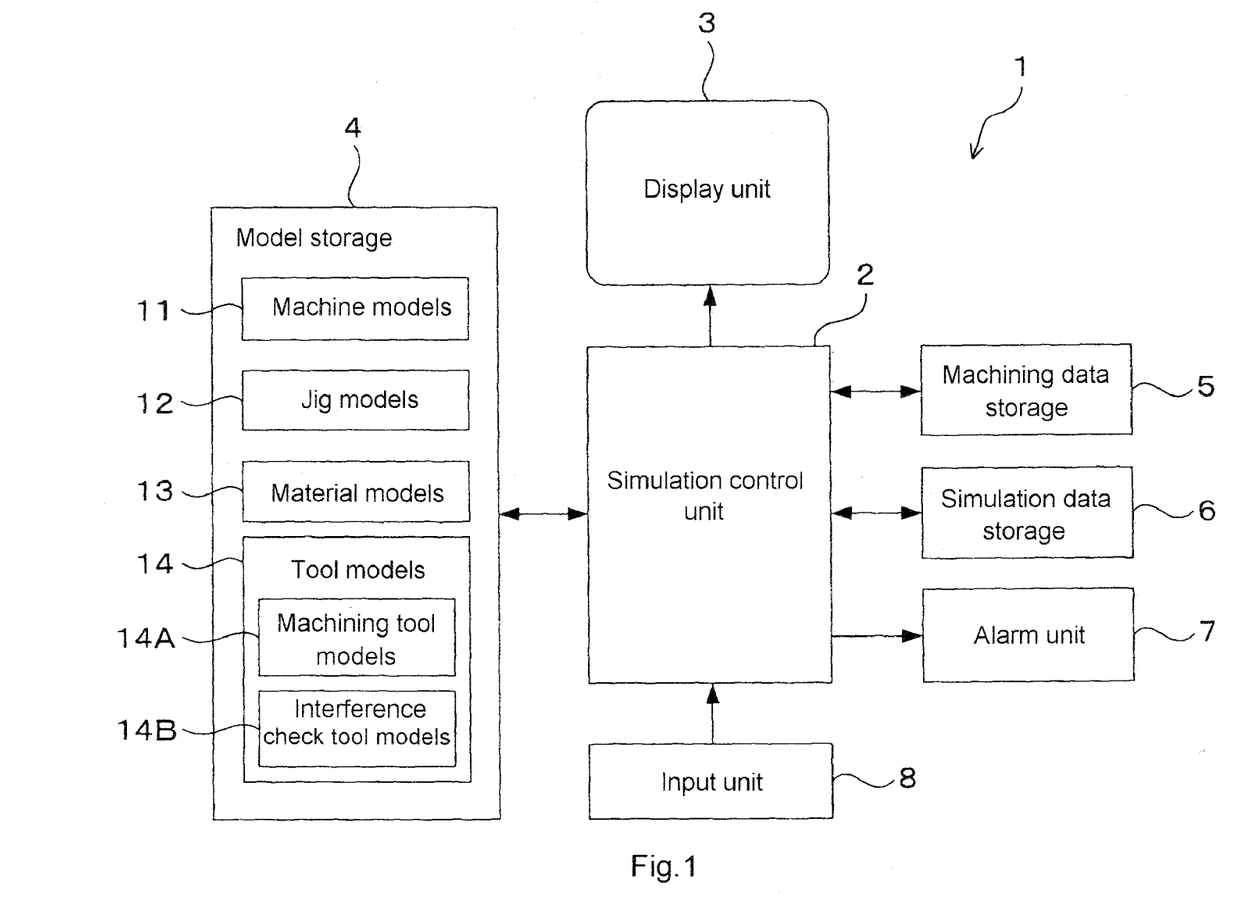
FIG. 1 schematically shows the configuration of a machining simulation apparatus according to one embodiment of the present invention.

Embodiments of the present invention will be described hereinafter with reference to drawings. FIG. 1 schematically shows the overall configuration of a machining simulation apparatus 1 for use with machine tools. The machining simulation apparatus 1 includes a simulation control unit 2 for controlling the overall operation of the apparatus 1, a display unit 3 for showing simulation screens, a model storage 4 for storing a variety of models, a machining data storage 5 for storing machining data including axis movement commands of NC programs and manual operations, a simulation data storage 6 for storing programs and parameters used for simulation, an alarm unit 7 for issuing an alarm when interference between models are detected, and an input unit 8 manipulated by an operator to enter various inputs.

The model storage 4 stores machine models 11 that define mechanical elements, such as spindle heads and tables, jig models 12 that define jigs, such as chucks and holders, material models 13 that define the shapes of various workpieces, and tool models 14 that define the shapes of actual tools for machining the workpieces. According to axis movement commands for cutting feed, the simulation control unit 2 controls the relative positions between one of the tool models 14 and at least one machine model 11, at least one jig model 12, and at least one material model 13 selected from the model storage 4 for the purpose of machining simulation and shows how the tool model 14 cuts away part of the material model 13 on the screen of the display unit 3. Moreover, the apparatus is adapted to check for any interference of the tool model 14 with the material model 13, the jig model 12, and the machine model 11 according to an axis movement command for rapid traverse and shows the condition of such interference on the screen of the display unit 3.

Figure 2:
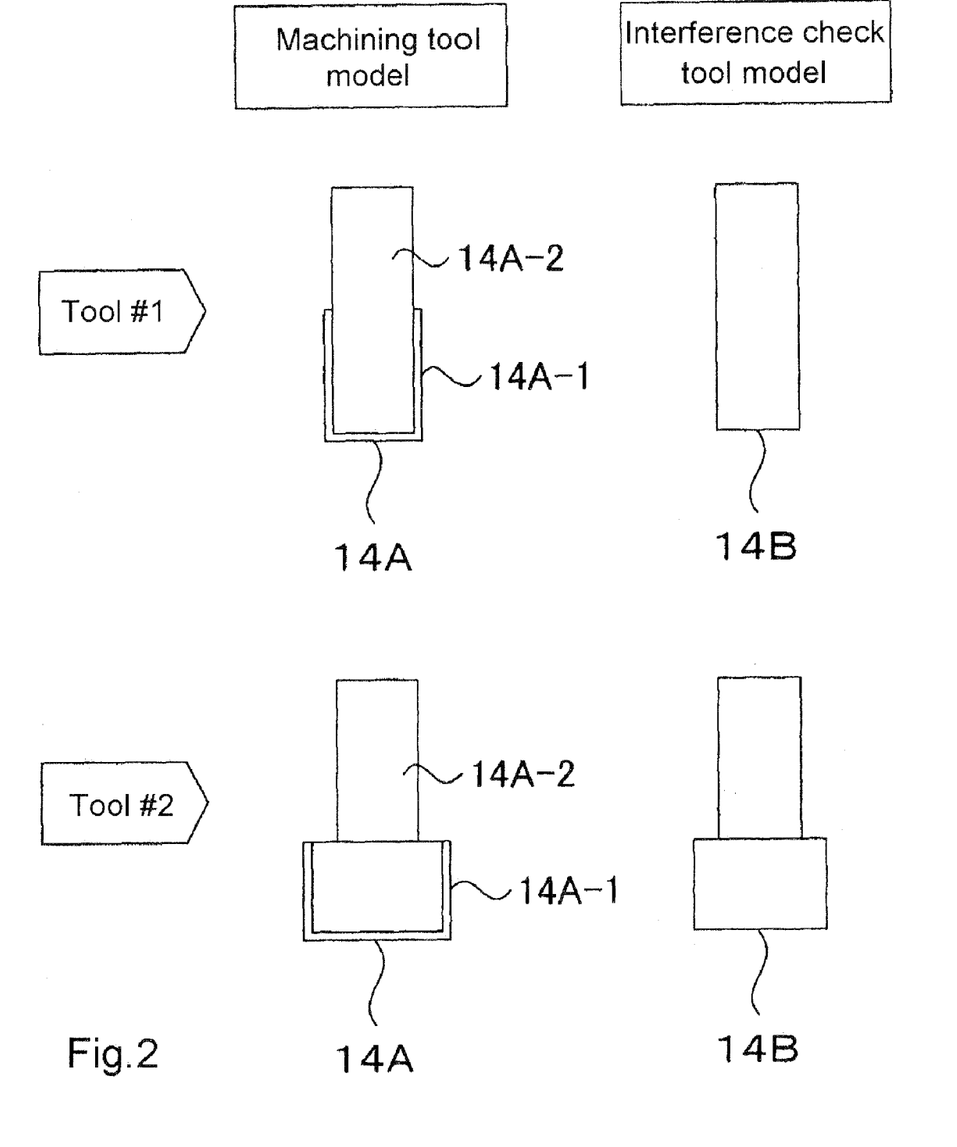
FIG. 2 is a schematic diagram showing the assortment of tool models of the machining simulation apparatus shown in FIG. 1.

FIG. 2 shows an exemplary assortment of the tool models 14 of the machining simulation apparatus 1. In the machining simulation apparatus 1, the tool models 14 include a machining tool model 14A and an interference check tool model 14B for each of the actual tools (e.g., Tool #1 and Tool #2 shown in FIG. 2) available for machining. The machining tool model 14A is used to cut away part of the material model 13, whereas the interference check tool model 14B is used to check for interference with the material model 13, the jig model 12, and the machine model 11. The simulation control unit 2 updates the shape of the material model 13 on the basis of the locus of the machining tool model 14A as it is moved according to the axis movement commands stored in the machining data storage 5, while checking to see if there is any interference between the interference check tool model 14B and any of the other models 11-13 and causing the alarm unit 7 to issue an alarm if interference is detected.

Figure 3:
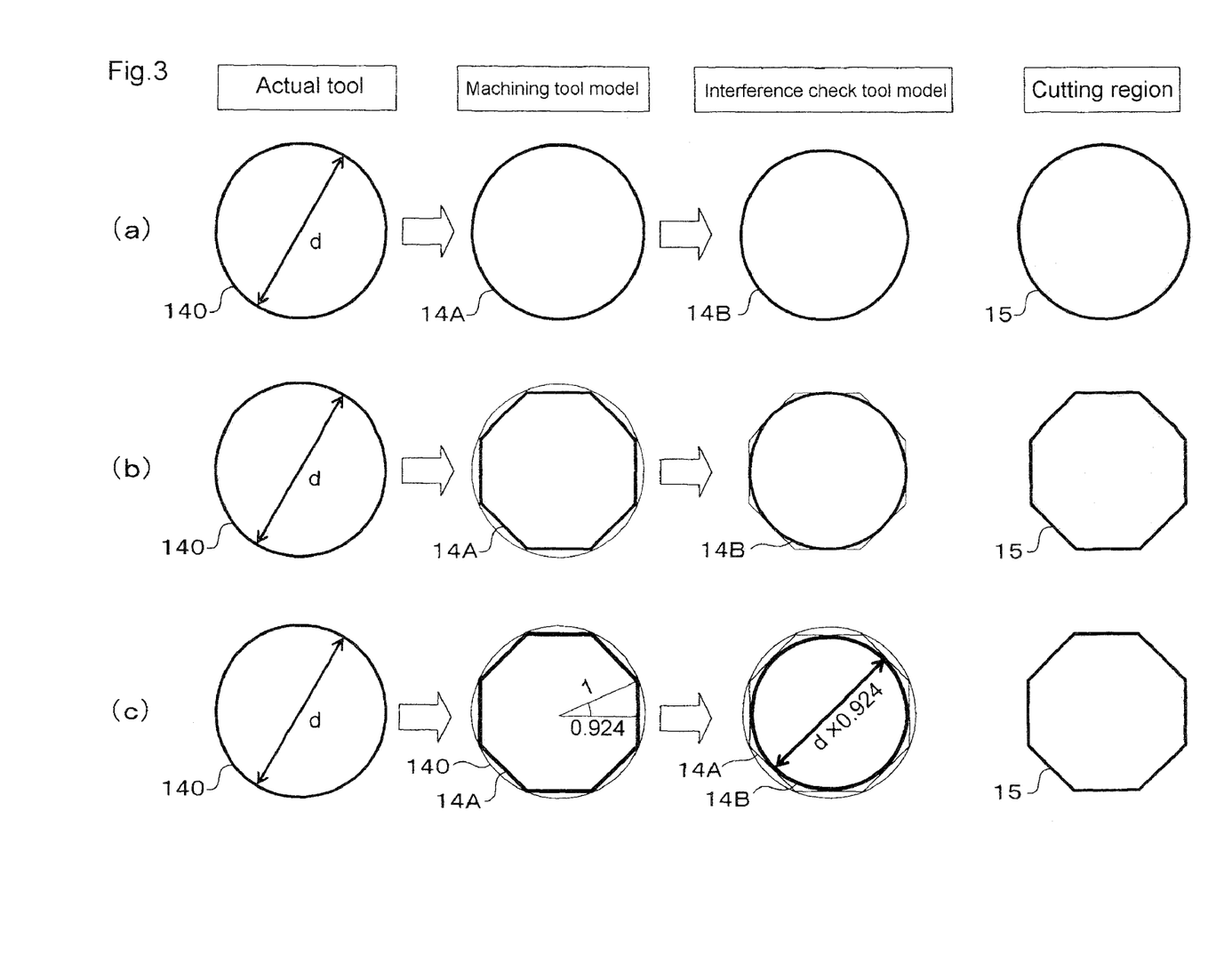
FIG. 3 is a schematic diagram showing the cross sections of the machining tool models and the interfering check tool models of the machining simulation apparatus shown in FIG. 1.

FIG. 3 illustrates the cross sections of the actual tool 140, the machining tool model 14A, the interference check tool model 14B, and the cutting region 15. The machining tool model 14A and the interference check tool model 14B are defined as having the shape of either a cylinder or a polygonal column generally similar to the shape of the actual tool 140. For example, as shown in FIG. 3A, when a tool 140 having a diameter of d is selected for use, the machining tool model 14A is defined as having a circular cross section (oriented perpendicular to the tool axis) of the same diameter as that of the tool 140. The interference check tool model 14B is defined as having a circular cross section of a diameter smaller than that of the machining tool model 14A. The cutting region 15, used for updating the material model, is calculated as having the shape of a cylinder of the same diameter as that of the machining tool model 14A and is removed from the material model 13 in the machining simulation.

Alternatively, as shown in FIG. 3B, the machining tool model 14A may be defined approximately as having a polygonal cross section that is inscribed in a circle of the same diameter as that of the tool 140. On the other hand, the interference check tool model 14B is defined as having a circular cross section either inscribed in the polygon of the machining tool model 14A or having a smaller diameter than that. The cutting region 15, used for updating the material model, is defined as having the shape of a polygonal column of the same size as that of the machining tool model 14A. As shown in FIG. 3C, if the machining tool model 14A is defined as having a cross section of an octagon, the diameter of the circle inscribed in that octagon is 0.924 times the diameter of the circumscribed circle (i.e., the tool diameter). Accordingly, setting the diameter of the interference check tool model 14B to d×0.924 or less provides an interference check tool model 14B that avoids interference with the cutting region shown in FIG. 3B.

Figure 4:
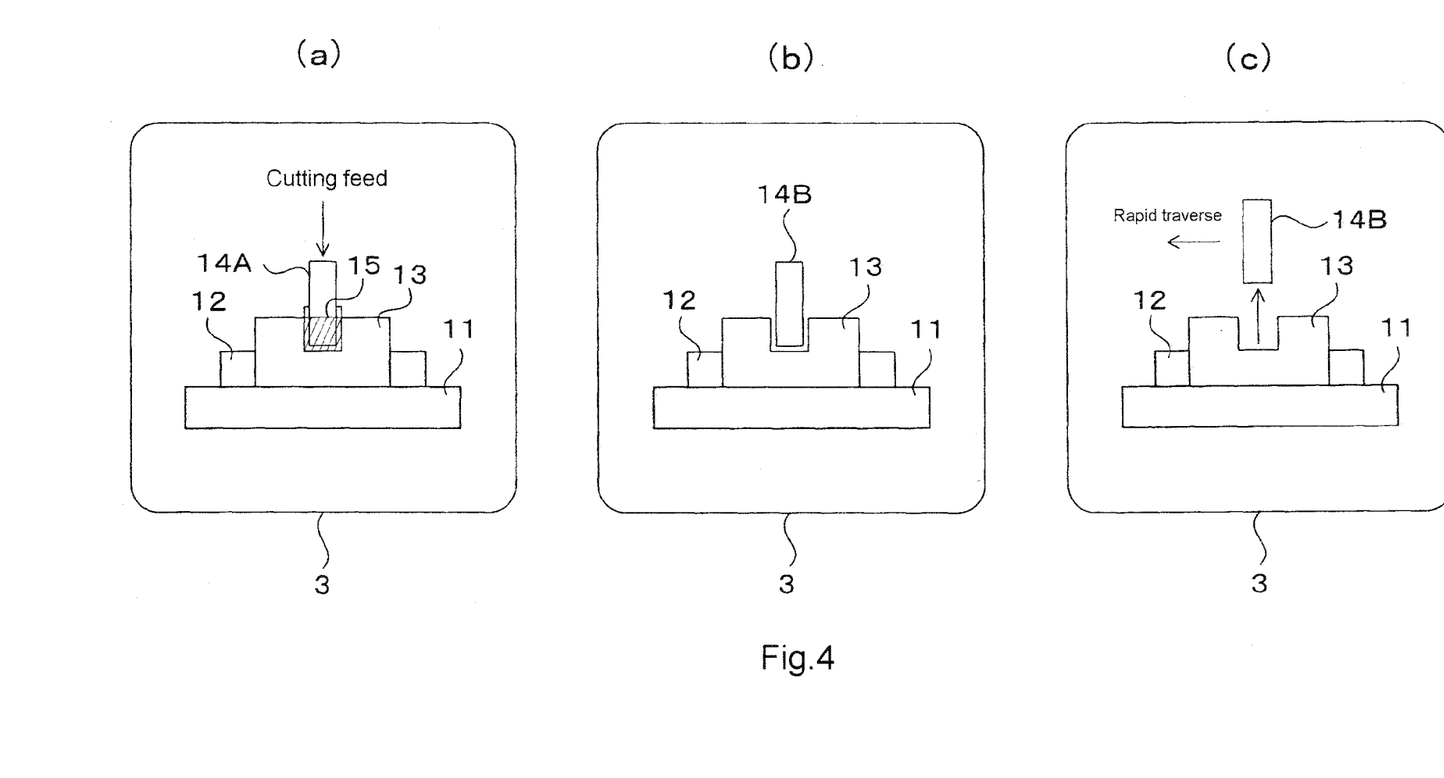
FIG. 4 is a process chart showing the steps of a method of machining simulation according to the present invention.

FIG. 4 illustrates a method according to the present invention for machining simulation using the machining tool model 14A and the interference check tool model 14B. In cutting the material model 13, as shown in FIG. 4A, the machining tool model 14A, either in the shape of a cylindrical or polygonal column, is positioned according to the axis movement commands stored in the machining data storage 5 and then the machining tool model 14A is moved relative to the machine model 11, the jig model 12, and the material model 13 according to the axis movement commands for cutting feed so as to cause the machining tool model 14A to cut away part of the material model 13. In the course of this process, the overlapping region between the material model 13 and the machining tool model 14A is calculated as the cutting region 15 and the shape of the material model 13 is updated by removing the cutting region 15 from the material model 13.

If the next axis movement command stored in the machining data storage 5 is for rapid traverse, the simulation control unit 2 reads from the model storage 4 the interference check tool model 14B and replaces the machining tool model 14A with the tool model 14B as shown in FIG. 4B in order to check for potential interference of the tool model with the machine model, the jig model, and the material model. A model having the shape of a cylinder or a polygonal column smaller than the machining tool model 14A is used as the interference check tool model 14B. As shown in FIG. 4C, subsequently, a check is performed to see if interference occurs between the material model 13 and the interference check tool model 14B in the course of the retraction of the interference check tool model 14B from the material model 13 according to the axis movement commands for rapid traverse. Subsequently, a check is run for interference of the interference check tool model 14B with the jig model 12 and the machine model 11 as this tool model 14B is moved according to the axis movement commands for rapid traverse stored in the machining data storage 5. The alarm unit 7 issues an alarm if interference occurs.

According to the machining simulation apparatus 1 of this embodiment, since the machining tool model 14A and the interference check tool model 14B are used for different purposes, the intermediate process of comparing the volume of the interference region with the allowable value is eliminated as has been done conventionally, thus permitting direct determination of whether interference occurs or not. Accordingly, there is no possibility of overlooking even very slight contact between the interference check tool model 14B and the models 11-13 due to a shift of the tool locus, thus reducing the likelihood of erroneously identifying as interference acceptable contact that occurs, for example, due to a tool phase shift. Furthermore, by defining the interference check tool model 14B as having a smaller shape than the machining tool model 14A, the interference check tool model 14B is configured to absorb or tolerate calculation errors that may occur when the material model 13 is updated, thus reducing the processing load on the system.

The present invention is not limited to the foregoing embodiments and can still be carried out with the arrangements of various parts and procedures altered as required, in a manner still in keeping with the spirit of the present invention as set forth below.

For example, a plurality of differently sized interference check tool models 14B may be used in combination with a single machining tool model 14A.

Furthermore, each of the machining tool models 14A shown in FIG. 2 may be defined as comprising a cutting tool model 14A-1 and a shank model 14A-2 so as to use the cutting tool model 14A-1 as the machining tool model 14A and the shank model 14A-2 as the interference check tool mode 14B. In other words, the cutting tool model 14A-1 is used to update the material model 13 according to axis movement commands for cutting feed, whereas the shank model 14A-2 is used to check for any interference with the machine model, the jig model, and the material model. Alternatively, both of the cutting tool model 14A-1 and the shank model 14A-2 may be used for interference check in which no interference is identified if only the cutting tool model 14A-1 overlaps the material model 13.

Having described the invention, what is claimed as new and desired to be secured by Letters Patent is:

1. A machining simulation apparatus for cutting of a material model with a tool model and checking for interference of the tool model at least with the material model by controlling the relative positions of the tool model and the material model according to axis movement commands, the apparatus comprising:

model storage for storing the material model and the tool model, and a simulation control unit for updating a shape of the material model on the basis of a locus of the tool model as the tool model is moved according to the axis movement commands, wherein the tool model stored in the model storage includes a machining tool model for cutting and updating the shape of the material model on the basis of the locus and at least one interference check tool model used for the interference check, wherein the at least one interference check tool model is defined as having a smaller shape than that of the machining tool model.

2. A machining simulation apparatus in accordance with claim 1, wherein the machining tool model is defined as having a circular cross section and the at least one interference check tool model is defined as having a circular cross section whose diameter is smaller than that of the circular cross section of the machining tool model.

3. A machining simulation apparatus in accordance with claim 1, wherein the machining tool model is defined as having a polygonal cross section and the at least one interference check tool model is defined as having a circular cross section that is inscribed in the polygonal cross section of the machining tool model.

4. A machining simulation apparatus in accordance with claim 1, wherein the model storage further stores at least one machine model and at least one jig model, and further wherein the apparatus checks for any interference between the tool model and the material model, the at least one machine model, and the at least one jig model.

* * * * *